US012257854B2

(12) United States Patent
Sato

(10) Patent No.: US 12,257,854 B2
(45) Date of Patent: Mar. 25, 2025

(54) PRINTING APPARATUS

(71) Applicant: SEIKO EPSON CORPORATION, Tokyo (JP)

(72) Inventor: Takumi Sato, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 296 days.

(21) Appl. No.: 18/064,359

(22) Filed: Dec. 12, 2022

(65) Prior Publication Data

US 2023/0182494 A1 Jun. 15, 2023

(30) Foreign Application Priority Data

Dec. 13, 2021 (JP) ................................ 2021-201474

(51) Int. Cl.
*B41J 29/13* (2006.01)
*B41J 29/02* (2006.01)

(52) U.S. Cl.
CPC ............... *B41J 29/13* (2013.01); *B41J 29/02* (2013.01)

(58) Field of Classification Search
CPC ............... B41J 2/32; B41J 29/02; B41J 29/04
See application file for complete search history.

(56) References Cited

U.S. PATENT DOCUMENTS 5,694,159 A * 12/1997 Kajiya ....................... B41J 2/32 347/222
6,494,631 B1 * 12/2002 Mastinick ............. B41J 33/003 400/663
8,358,324 B2 * 1/2013 Kokuta .................... B41J 2/325 347/197
9,559,380 B2 * 1/2017 Upadhyaya ......... H01M 4/0404

FOREIGN PATENT DOCUMENTS

JP 2004-209722 A 7/2004

* cited by examiner

*Primary Examiner* — Anh T Vo
(74) *Attorney, Agent, or Firm* — WORKMAN NYDEGGER

(57) ABSTRACT

A printing apparatus includes a printing unit, a frame, a cover configured to open and close relative to the frame, and an open-close mechanism. The open-close mechanism includes a base attached to the frame, a holder attached to the base, a shaft attached to the holder, an arm attached to the shaft, the cover being attached to the arm, and a lockscrew configured to fix the holder to the base. The base includes an attachment hole used to attach the holder to the base, and a protrusion protruding toward the holder. The holder includes a holder hole overlapping with the attachment hole, and a guide hole into which the protrusion is inserted. The guide hole is an elongated hole elongated in one direction. The holder hole is an elongated hole elongated in the one direction. The lockscrew is inserted into the attachment hole and the holder hole.

6 Claims, 11 Drawing Sheets

PRINTING APPARATUS

The present application is based on, and claims priority from JP Application Serial Number 2021-201474, filed on Dec. 13, 2021, the disclosure of which is hereby incorporated by reference herein in its entirety.

BACKGROUND

1. Technical Field

The present disclosure relates to a printing apparatus.

2. Related Art

JP-A-2004-209722 describes a printing apparatus including an open-close mechanism attached to a frame and a cover. The cover rotates relative to the frame to open and close relative to the frame.

In such a printing apparatus, the dimensions of the frame and the cover vary. Thus, depending on the dimension of each component, there is a possibility that the cover cannot appropriately open and close relative to the frame.

SUMMARY

A printing apparatus that solves the problem described above includes a printing unit configured to perform printing on a medium, a frame configured to accommodate the printing unit, a cover configured to rotate relative to the frame to open and close relative to the frame, and an open-close mechanism attached to the frame and the cover, in which the open-close mechanism includes a base attached to the frame, a holder attached to the base, a shaft attached to the holder, an arm attached to the shaft, the cover being attached to the arm, and a lockscrew configured to fix the holder to the base, the base includes an attachment hole used to attach the holder to the base, and a protrusion protruding toward the holder, the holder includes a holder hole overlapping with the attachment hole, and a guide hole into which the protrusion is inserted, the guide hole is an elongated hole elongated in one direction, the holder hole is an elongated hole elongated in the one direction, and the lockscrew is inserted into the attachment hole and the holder hole.

A printing apparatus that solves the problem described above includes a printing unit configured to perform printing on a medium, a frame configured to accommodate the printing unit, a cover configured to rotate relative to the frame to open and close relative to the frame, and an open-close mechanism attached to the frame and the cover, in which the open-close mechanism includes a holder attached to the frame, a shaft held by the holder, an arm held by the shaft, the cover being attached to the arm, and a lockscrew configured to fix the holder to the frame, the frame includes an attachment hole used to attach the holder to the frame, and a protrusion protruding toward the holder, the holder includes a holder hole overlapping with the attachment hole, and a guide hole into which the protrusion is inserted, the guide hole is an elongated hole elongated in one direction, the holder hole is an elongated hole elongated in the one direction, and the lockscrew is inserted into the attachment hole and the holder hole.

A printing apparatus that solves the problem described above includes a printing unit configured to perform printing on a medium, a frame configured to accommodate the printing unit, a cover configured to rotate relative to the frame to open and close relative to the frame, and an open-close mechanism attached to the frame and the cover, in which the open-close mechanism includes a base attached to the frame, a holder attached to the base, a shaft held by the holder, an arm held by the shaft, the cover being attached to the arm, and a lockscrew configured to fix the holder to the base, the base includes a first base plate extending in one direction, a second base plate extending in the one direction, and an attachment plate including an attachment hole formed therein, the attachment hole being used to attach the holder to the base, the holder includes a first holder plate extending in the one direction and opposed to the first base plate, a second holder plate extending in the one direction and opposed to the second base plate, and an adjustment plate opposed to the attachment plate and including a holder hole formed therein and overlapping with the attachment hole, the first holder plate is in contact with the first base plate, the second holder plate is in contact with the second base plate, the holder hole is an elongated hole elongated in the one direction, and the lockscrew is inserted into the attachment hole and the holder hole.

DESCRIPTION OF EXEMPLARY EMBODIMENTS

Below, one embodiment of the present apparatus will be described with reference to the drawings. For example, the printing apparatus is an ink jet-type printer configured to eject ink serving as one example of a liquid onto a medium such as a sheet, fiber, or the like to perform printing of an image such as letters, photographs, or the like.

First Embodiment

Figure 1:
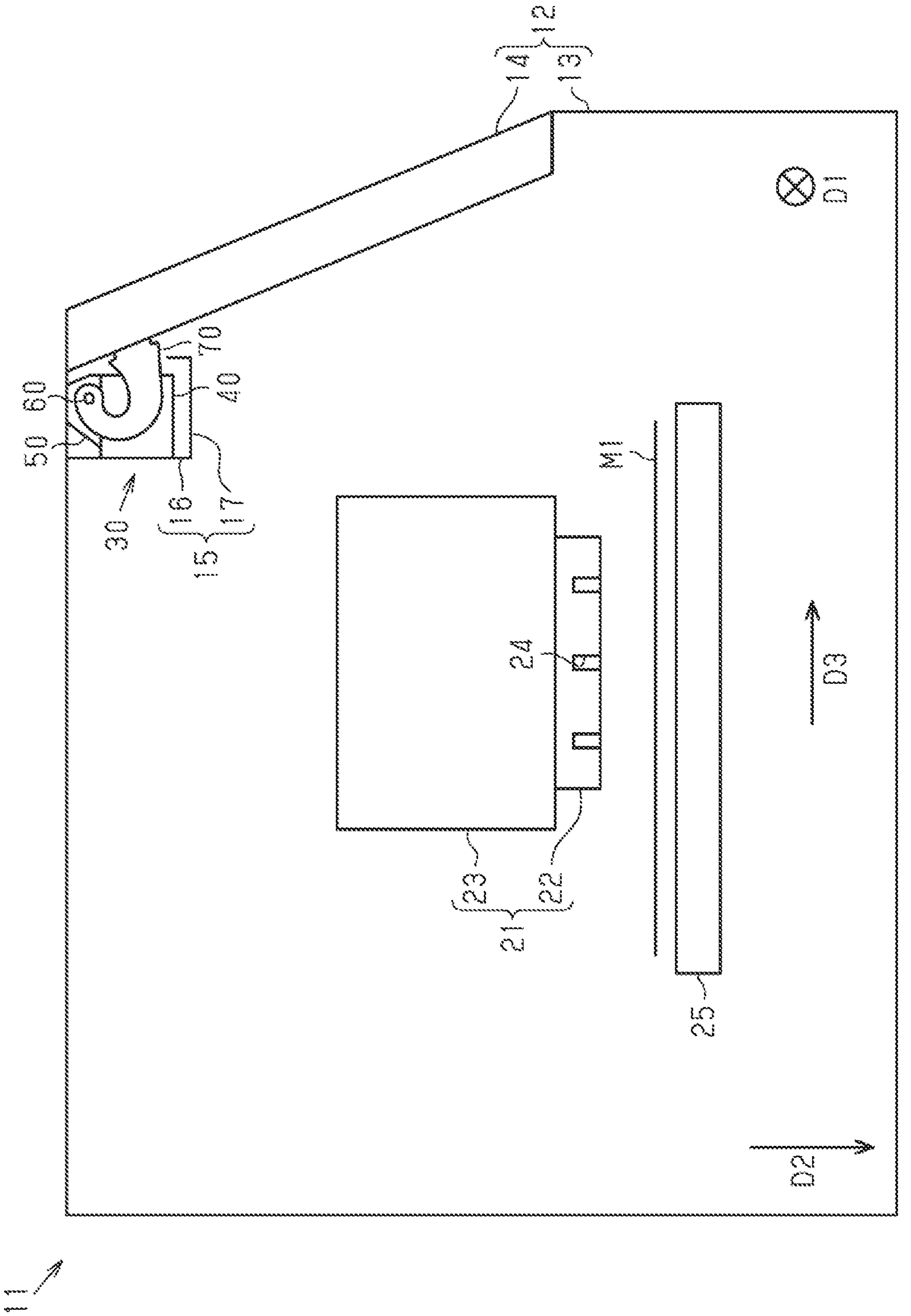
FIG. 1 is a side view illustrating a printing apparatus according to a first embodiment.

As illustrated in FIG. 1, the printing apparatus 11 includes a housing 12. The housing 12 constitutes an outer packaging of the printing apparatus 11. The housing 12 includes a frame 13 and a cover 14.

The frame 13 is made, for example, of metal. The frame 13 includes a connection portion 15. The connection portion 15 is a portion of the frame 13 that is coupled to the cover 14. In the present embodiment, the connection portion 15 is disposed in an upward and frontward portion of the frame 13.

The connection portion 15 includes, for example, a first coupling plate 16 and a second coupling plate 17. The first coupling plate 16 and the second coupling plate 17 extend in a first direction D1. The first coupling plate 16 and the second coupling plate 17 extend, for example, throughout the width of the housing 12. This configuration provides the frame 13 with rigidity.

The first coupling plate 16 extends from the upper portion of the frame 13 in a second direction D2. The second direction D2 is a direction differing from the first direction D1. For example, the second direction D2 is a vertical direction. The first coupling plate 16 is a plate stretching in the first direction D1 and the second direction D2.

The second coupling plate 17 extends from the first coupling plate 16 in a third direction D3. The second coupling plate 17 extends so as to bend from the first coupling plate 16. The third direction D3 is a direction differing from the first direction D1 and the second direction D2. In the present embodiment, the third direction D3 is a direction extending from the rear of the printing apparatus 11 toward the front. The second coupling plate 17 is a plate stretching in the first direction D1 and the third direction D3.

The cover 14 is coupled to the frame 13. Specifically, one end of the cover 14 is coupled to the frame 13. This one end of the cover 14 is coupled to the connection portion 15. The cover 14 is able to open and close relative to the frame 13. The cover 14 rotates to open and close relative to the frame 13. In FIG. 1, the cover 14 closes relative to the frame 13. In FIG. 1, the cover 14 rotates counterclockwise to open relative to the frame 13. As the cover 14 opens, it is possible to access the inside of the housing 12. The cover 14 is made, for example, of a transparent or translucent resin.

The printing apparatus 11 includes a printing unit 21. The printing unit 21 is accommodated in the housing 12. Specifically, the printing unit 21 is accommodated in the frame 13. The printing unit 21 is configured to perform printing on a medium M1. The printing unit 21 includes, for example, a head 22 and a carriage 23.

The head 22 includes one or more nozzles 24. The head 22 ejects a liquid from the nozzles 24. The head 22 ejects a liquid from the nozzles 24 onto the medium M1 to perform printing of an image on the medium M1.

The head 22 is mounted at the carriage 23. The carriage 23 scans the medium M1. The carriage 23 moves in the first direction D1. Specifically, the carriage 23 reciprocates in the first direction D1 and a direction opposite to the first direction D1. Thus, in the present embodiment, the printing apparatus 11 is a serial printer. The printing apparatus 11 may be a line printer that is able to perform printing throughout the width of the medium M1 at once. In addition, the printing apparatus 11 is not limited to the inkjet printer, and may be a toner-jet printer or may be a dot-impact printer.

The printing apparatus 11 includes a support portion 25. The support portion 25 is accommodated in the housing 12. The support portion 25 is opposed to the printing unit 21. The support portion 25 is configured to support the medium M1. The support portion 25 supports the medium M1 on which the printing unit 21 performs printing. For example, the support portion 25 supports the medium M1 that is transported in the third direction D3. For example, the medium M1 on which printing has been performed is transported in the third direction D3, and is discharged outside of the housing 12.

The printing apparatus 11 includes one or more open-close mechanisms 30. The open-close mechanisms 30 are mechanisms configured to couple the frame 13 and the cover 14 such that the cover 14 is able to open and close relative to the frame 13. Thus, the cover 14 is coupled to the frame 13 through the open-close mechanism 30.

The open-close mechanism 30 is, for example, a hinge. The open-close mechanism 30 is attached to the frame 13 and the cover 14. The open-close mechanism 30 is fixed to the connection portion 15. In the present embodiment, the open-close mechanism 30 is fixed to the first coupling plate 16. The open-close mechanism 30 may be fixed to the second coupling plate 17. When the printing apparatus 11 includes the plurality of open-close mechanisms 30, the open-close mechanisms 30 are arrayed in the first direction D1. For example, the open-close mechanisms 30 are arrayed at the first coupling plate 16.

As illustrated in FIGS. 2, 3, 4, and 5, the open-close mechanism 30 includes, for example, a base 40, a holder 50, a shaft 60, an arm 70, and one or more lockscrews 80. The base 40, the holder 50, the shaft 60, and the arm 70 are each made, for example, of metal. The base 40, the holder 50, and the arm 70 are each comprised, for example, of a steel plate.

The base 40 is attached to the frame 13. Specifically, the base 40 is attached to the first coupling plate 16. The holder 50 is attached to the base 40. The shaft 60 is attached to the holder 50. The shaft 60 is a rotary shaft for the cover 14. The arm 70 is attached to the shaft 60. The cover 14 is attached to the arm 70. The lockscrew 80 is a screw used to fix the holder 50 to the base 40. As the arm 70 rotates with the shaft 60 being the center, the open-close mechanism 30 causes the cover 14 to open and close relative to the frame 13.

Next, the base 40 will be described.

Figure 6:
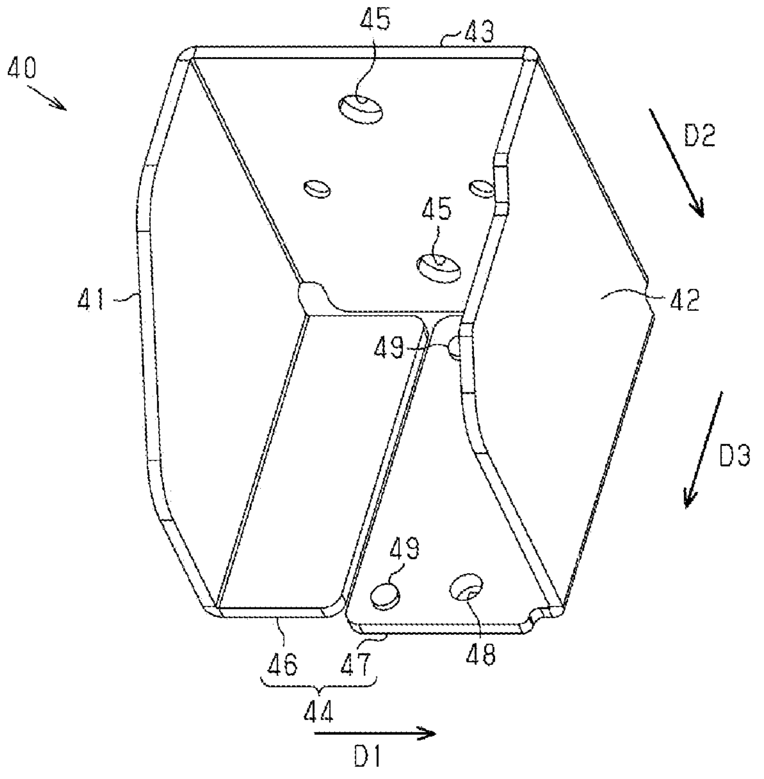
FIG. 6 is a perspective view illustrating a base.
Figure 7:
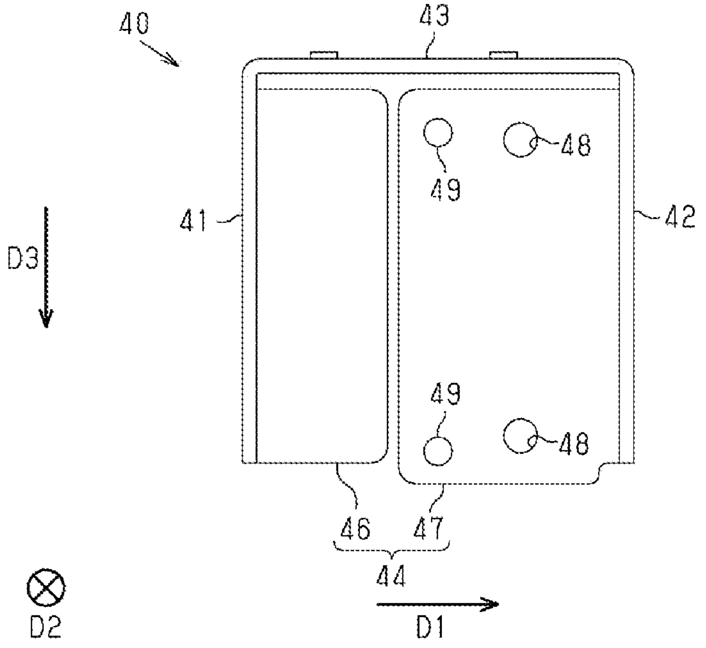
FIG. 7 is a top view illustrating the base.

As illustrated in FIGS. 6 and 7, the base 40 includes a first base plate 41, a second base plate 42, a fixing plate 43, and an attachment plate 44.

The first base plate 41 and the second base plate 42 are plates each stretching in the second direction D2 and the third direction D3. Thus, the first base plate 41 and the second base plate 42 each extend in the second direction D2. The first base plate 41 and the second base plate 42 each extend in the third direction D3. For example, the first base plate 41 and the second base plate 42 are parallel to each other.

The first base plate 41 and the second base plate 42 are arrayed in the first direction D1. The first base plate 41 and the second base plate 42 extend, for example, from the fixing plate 43 in the third direction D3. The first base plate 41 and the second base plate 42 extend from corresponding ends of the fixing plate 43, for example. The first base plate 41 and the second base plate 42 extend so as to bend from the fixing plate 43.

The fixing plate 43 is a plate stretching in the first direction D1 and the second direction D2. Thus, the fixing plate 43 extends in the first direction D1. The fixing plate 43 extends in the second direction D2. The fixing plate 43 is perpendicular to the first base plate 41 and the second base plate 42, for example. The fixing plate 43 is connected to the first base plate 41 and the second base plate 42, for example.

The fixing plate 43 is attached to the frame 13. For example, the fixing plate 43 is parallel to the first coupling plate 16. The fixing plate 43 is opposed to the first coupling plate 16. The fixing plate 43 is in contact with the first coupling plate 16. The fixing plate 43 is fixed to the first coupling plate 16.

The fixing plate 43 includes one or more fixing holes 45. For example, a screw is inserted into the fixing hole 45, whereby the fixing plate 43 is fixed to the first coupling plate 16. That is, the fixing plate 43 is fixed to the first coupling plate 16 using a screw. With this configuration, the open-close mechanism 30 is fixed to the frame 13.

The attachment plate 44 includes a plate stretching in the first direction D1 and the third direction D3. Thus, the attachment plate 44 extends in the first direction D1. The attachment plate 44 extends in the third direction D3. For example, the attachment plate 44 is perpendicular to the first base plate 41, the second base plate 42, and the fixing plate 43. For example, the attachment plate 44 is parallel to the second coupling plate 17. The attachment plate 44 is opposed to the second coupling plate 17. The attachment plate 44 is in contact with the holder 50. The holder 50 is attached to the attachment plate 44.

The attachment plate 44 includes, for example, a first attachment plate 46 and a second attachment plate 47. The first attachment plate 46 is a plate extending from the first base plate 41. The first attachment plate 46 extends so as to bend from the first base plate 41. Specifically, the first attachment plate 46 extends from the first base plate 41 toward the second base plate 42. The second attachment plate 47 extends from the second base plate 42. The second attachment plate 47 extends so as to bend from the second base plate 42. Specifically, the second attachment plate 47 extends from the second base plate 42 toward the first base plate 41. Thus, the attachment plate 44 is connected to the first base plate 41 and the second base plate 42. The attachment plate 44 may be comprised of one plate, or may be configured so as to extend from the fixing plate 43. For example, the first base plate 41 and the second base plate 42 extend so as to be flush with each other. The first attachment plate 46 and the second attachment plate 47 are aligned in the first direction D1.

The attachment plate 44 includes one or more attachment holes 48. The attachment holes 48 are holes used to attach the holder 50 to the base 40. For example, the attachment holes 48 are opened at the second attachment plate 47. The attachment holes 48 may be opened at the first attachment plate 46. The lockscrew 80 is inserted into the attachment hole 48. For example, the attachment holes 48 are screw holes. The attachment holes 48 engage with the lockscrews 80.

The attachment plate 44 includes one or more protrusions 49. The shape of the protrusion 49 is, for example, a cylindrical shape or a cylinder-like shape. The protrusions 49 are disposed at a surface of the attachment plate 44 that is opposed to the holder 50. The protrusions 49 protrude toward the holder 50. The protrusions 49 protrude toward a direction opposite to the second direction D2, that is, protrude upward. The protrusions 49 are disposed, for example, at the second attachment plate 47. The protrusions 49 may be disposed at the first attachment plate 46.

Next, the holder 50 will be described.

Figure 8:
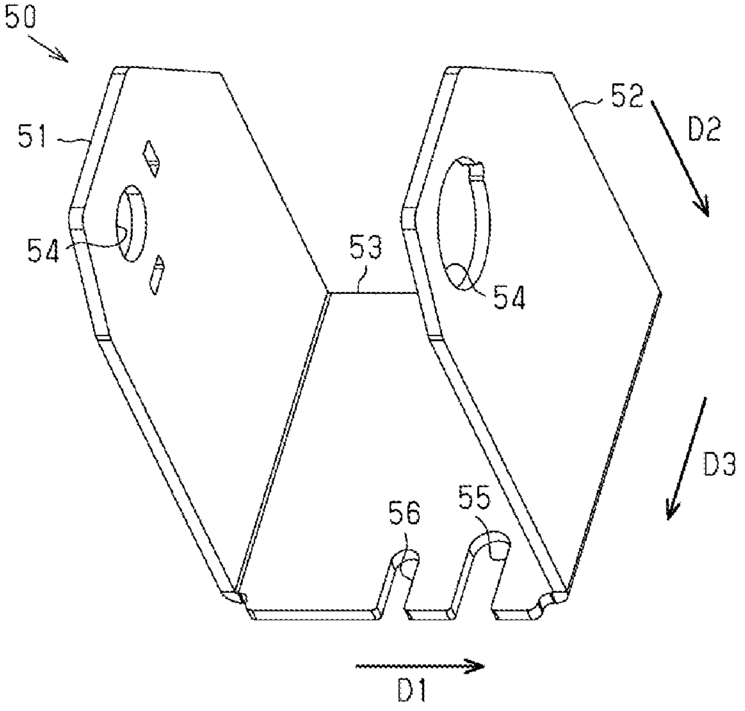
FIG. 8 is a perspective view illustrating a holder.
Figure 9:
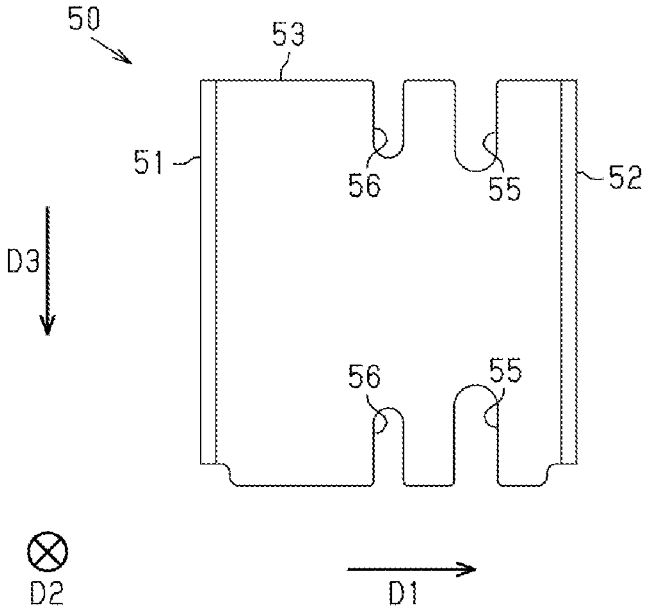
FIG. 9 is a top view illustrating the holder.

As illustrated in FIGS. 8 and 9, the holder 50 includes a first holder plate 51, a second holder plate 52, and an adjustment plate 53.

The first holder plate 51 and the second holder plate 52 are plates each stretching in the second direction D2 and the third direction D3. Thus, the first holder plate 51 and the second holder plate 52 extend in the second direction D2. The first holder plate 51 and the second holder plate 52 extend in the third direction D3. For example, the first holder plate 51 and the second holder plate 52 are parallel to each other.

The first holder plate 51 is opposed to the first base plate 41. The second holder plate 52 is opposed to the second base plate 42. In the present embodiment, the first holder plate 51 and the second holder plate 52 are disposed between the first base plate 41 and the second base plate 42. The first base plate 41 and the second base plate 42 may be disposed between the first holder plate 51 and the second holder plate 52.

The first holder plate 51 and the second holder plate 52 are arrayed in the first direction D1. The first holder plate 51 and the second holder plate 52 extend, for example, from the adjustment plate 53 in a direction opposite to the second direction D2, that is, extend upward. The first holder plate 51 and the second holder plate 52 each extend, for example, from a corresponding end of the adjustment plate 53. The first holder plate 51 and the second holder plate 52 extend so as to bend from the adjustment plate 53. The first holder plate 51 and the second holder plate 52 are connected to the adjustment plate 53.

The first holder plate 51 and the second holder plate 52 support the shaft 60. The first holder plate 51 and the second holder plate 52 each include a shaft hole 54. By inserting the shaft 60 into the corresponding shaft hole 54, the shaft 60 is attached to the holder 50. With this configuration, the holder 50 rotatably supports the shaft 60.

The adjustment plate 53 is a plate stretching in the first direction D1 and the third direction D3. Thus, the adjustment plate 53 extends in the first direction D1. The adjustment plate 53 extends in the third direction D3. For example, the adjustment plate 53 is perpendicular to the first holder plate 51 and the second holder plate 52. For example, the adjustment plate 53 is parallel to the attachment plate 44. The adjustment plate 53 is opposed to the attachment plate 44. The adjustment plate 53 is in contact with the attachment plate 44. The adjustment plate 53 is attached to the attachment plate 44.

The adjustment plate 53 includes one or more holder holes 55. The holder hole 55 is a hole used to attach the holder 50 to the base 40. The holder hole 55 overlaps with the attachment hole 48. The number of the holder holes 55 corresponds to the number of the attachment holes 48. By inserting the lockscrews 80 into the holder holes 55 and the attachment holes 48, the holder 50 is attached to the base 40.

The holder hole 55 is an elongated hole elongated in one direction. In the present embodiment, the holder hole 55 extends from the edge of the adjustment plate 53. The holder hole 55 is, for example, an elongated hole elongated in the third direction D3. Thus, even when the holder 50 moves in the third direction D3 relative to the base 40, it is possible to maintain a state in which the holder hole 55 overlaps with the attachment hole 48. Thus, the holder 50 is able to move in one direction relative to the base 40, that is, in the third direction D3 in a state in which the lockscrews 80 are inserted into the holder holes 55 and the attachment holes 48. This configuration makes it possible to adjust the position of the base 40 relative to the holder 50. By tightening the lockscrews 80 inserted into the holder holes 55 and the attachment holes 48, the position of the holder 50 relative to the base 40 is set. That is, the holder 50 is fixed to the base 40.

The adjustment plate 53 includes one or more guide holes 56. The guide holes 56 are holes configured to guide movement of the holder 50 relative to the base 40. The protrusions 49 are inserted into the guide holes 56. The number of the guide holes 56 corresponds to the number of the protrusions 49.

The guide holes 56 are elongated holes each elongated in one direction. In the present embodiment, the guide holes 56 extend from the edge of the adjustment plate 53. The guide holes 56 are, for example, elongated holes each elongated in the third direction D3. Thus, the holder 50 is able to move in the one direction relative to the base 40, that is, in the third direction D3 in a state in which the protrusions 49 are inserted into the guide holes 56. At this time, the adjustment plate 53 moves while being brought into contact with the attachment plate 44. That is, the holder 50 slides on the attachment plate 44.

In the present embodiment, the length of the guide hole 56 in the first direction D1, that is, the width of the guide hole 56 is equal to the diameter of the protrusion 49. Thus, in a state in which the protrusions 49 are inserted into the guide holes 56, the holder 50 is unable to move in the first direction D1, and is able to move in the third direction D3. In this manner, the guide holes 56 and the protrusions 49 guide the movement of the holder 50.

When the number of guide holes 56 is one and the number of protrusions 49 is one, there is a possibility that the holder 50 rotates with the protrusion 49 being the fulcrum when the holder 50 is moved relative to the base 40. For this reason, it is preferable that the number of guide holes 56 is two or more and the number of protrusions 49 is two or more.

Next, the shaft 60 will be described.

Figure 2:
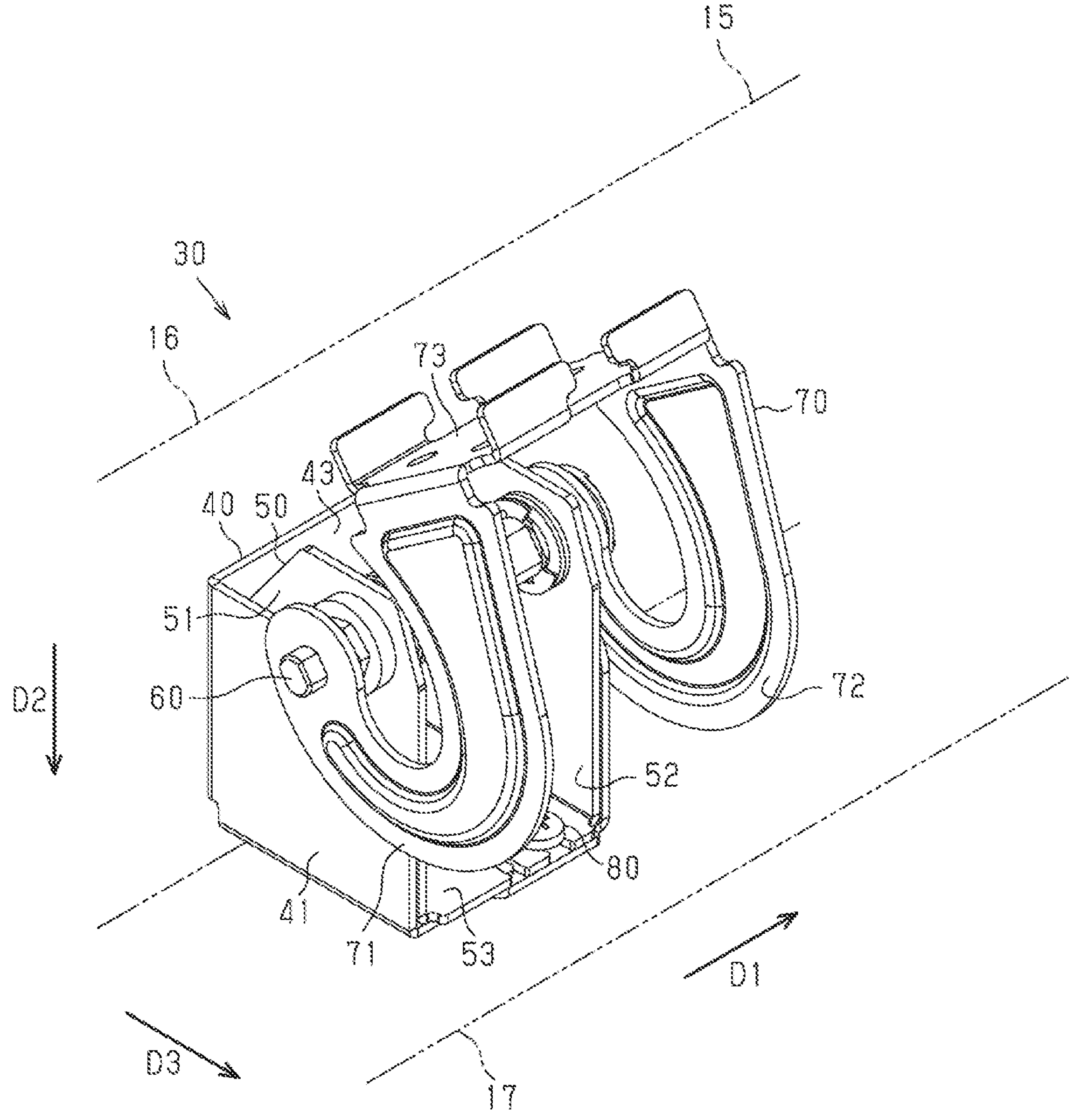
FIG. 2 is a perspective view illustrating an open-close mechanism.
Figure 3:
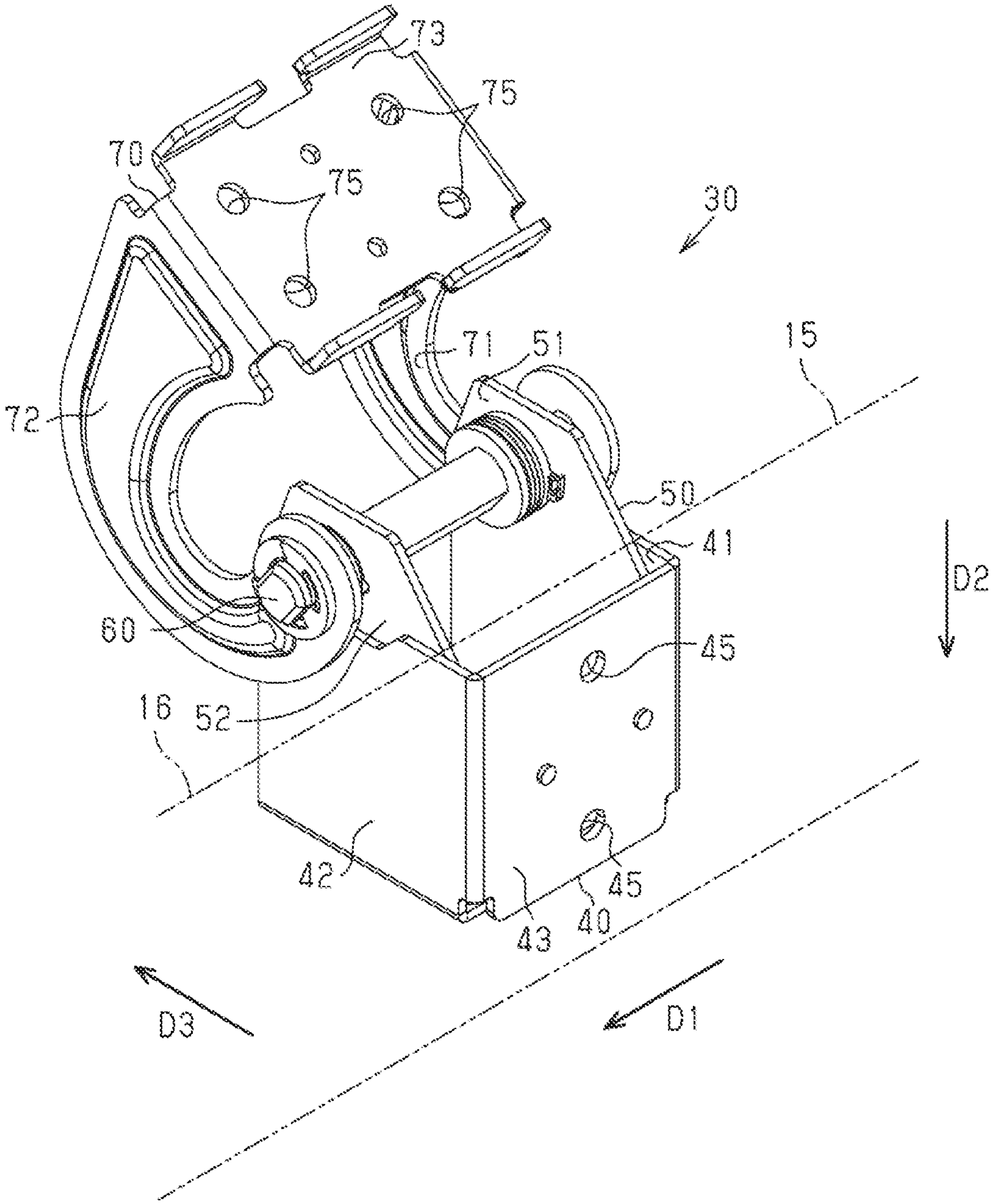
FIG. 3 is a perspective view illustrating the open-close mechanism as viewed from an angle differing from that in FIG. 2.
Figure 4:
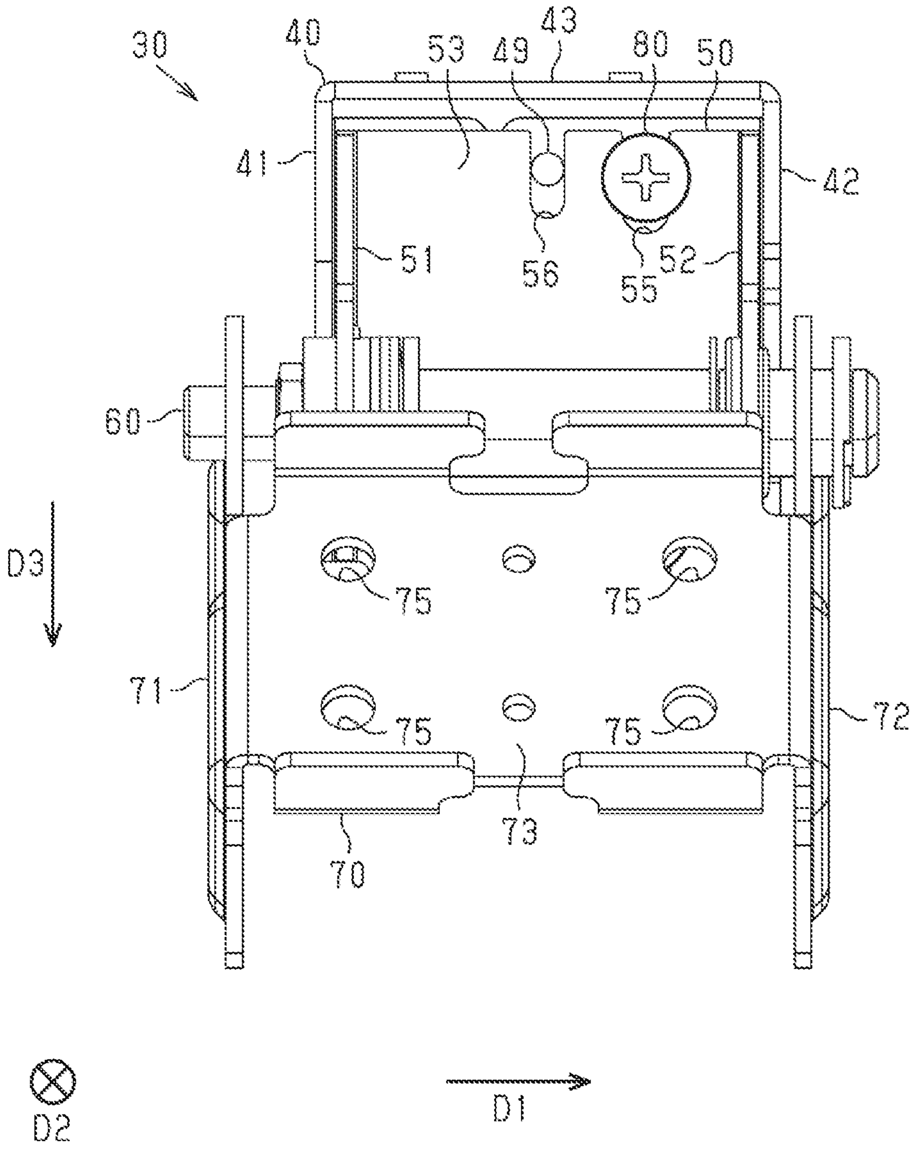
FIG. 4 is a top view illustrating the open-close mechanism.
Figure 5:
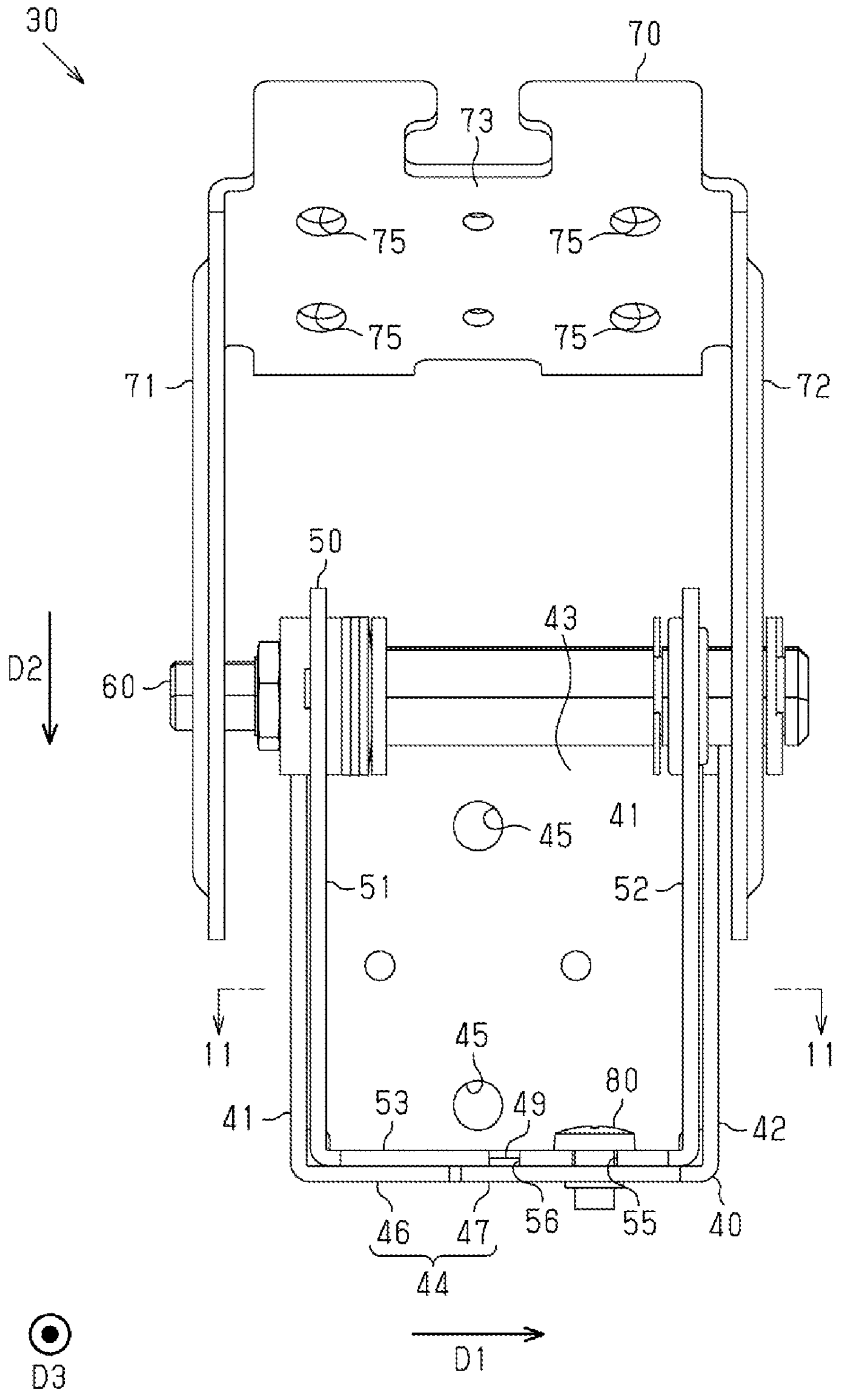
FIG. 5 is a front view illustrating the open-close mechanism.

As illustrated in FIGS. 2 and 3, the shaft 60 extends in the first direction D1. The shaft 60 extends, for example, so as to penetrate through the holder 50 and the arm 70. For example, the shaft 60 rotate integrally with the arm 70.

Next, the arm 70 will be described.

The arm 70 includes a first arm plate 71, a second arm plate 72, and a retention plate 73.

The first arm plate 71 and the second arm plate 72 are plates each stretching in the second direction D2 and the third direction D3. Thus, the first arm plate 71 and the second arm plate 72 extend in the second direction D2. The first arm plate 71 and the second arm plate 72 extend in the third direction D3. For example, the first arm plate 71 and the second arm plate 72 are parallel to each other.

The first arm plate 71 and the second arm plate 72 are arrayed in the first direction D1. In the present embodiment, the first arm plate 71, the first base plate 41, the first holder plate 51, the second holder plate 52, the second base plate 42, and the second arm plate 72 are arrayed in this order in the first direction D1. The order of the first arm plate 71, the first base plate 41, the first holder plate 51, the second holder plate 52, the second base plate 42, and the second arm plate 72 is not limited to this.

Figure 10:
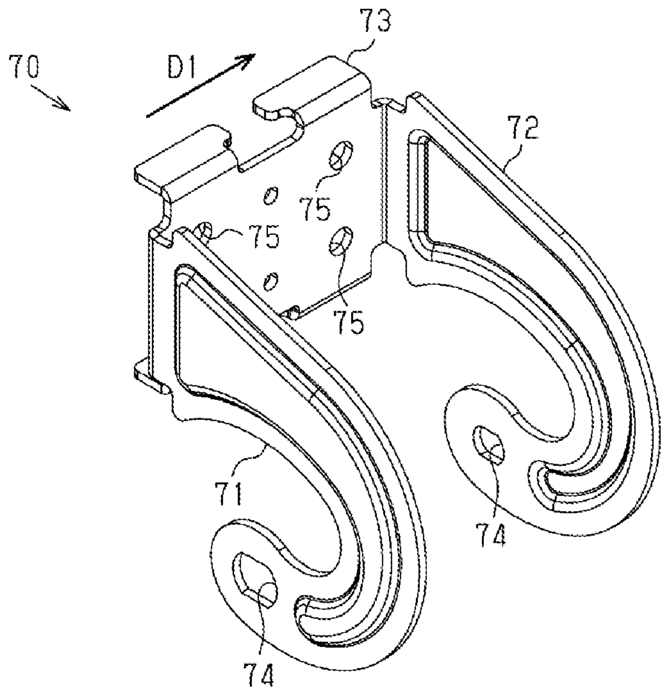
FIG. 10 is a perspective view illustrating an arm.

As illustrated in FIG. 10, the retention plate 73 extends from one end of the first arm plate 71 and one end of the second arm plate 72. The retention plate 73 is connected to one end of the first arm plate 71 and one end of the second arm plate 72. An insertion hole 74 is opened at each of the other end of the first arm plate 71 and the other end of the second arm plate 72. With the shaft 60 being inserted into the insertion hole 74, the arm 70 is supported by the shaft 60.

The retention plate 73 extends so as to bend from the first arm plate 71. The retention plate 73 extends so as to bend from the second arm plate 72. The retention plate 73 extends in the first direction D1.

One or more retention holes 75 are opened at the retention plate 73. The retention holes 75 are holes used to attach the cover 14. For example, by inserting a screw into the retention holes 75, the cover 14 is attached to the retention plate 73. That is, the cover 14 is fixed to the retention plate 73 using a screw. As the first arm plate 71 and the second arm plate 72 rotate with the shaft 60 being the center, the retention plate 73 is displaced. Thus, the cover 14 opens and closes.

Next, description will be made of adjustment of the position of the holder 50 relative to the base 40.

Figure 11:
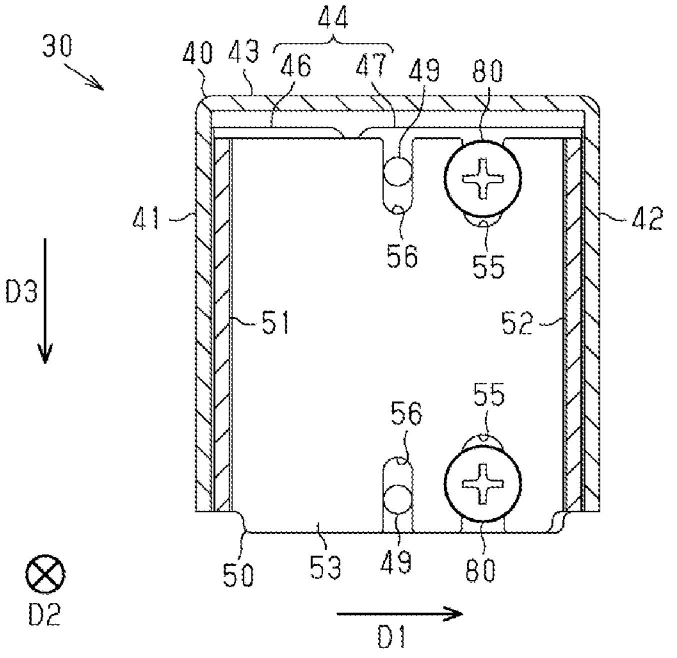
FIG. 11 is a cross-sectional view taken along the line 11-11 in FIG. 5.

As the protrusion 49 is guided by the guide hole 56 as illustrated in FIG. 11, the holder 50 moves in the third direction D3 relative to the base 40. Specifically, the holder 50 moves relative to the base 40 toward the third direction D3 and a direction opposite to the third direction D3. As the holder 50 moves in the third direction D3, the cover 14 moves in the third direction D3 relative to the frame 13. With this configuration, it is possible to adjust the position of the cover 14 relative to the frame 13. After the position of the holder 50 relative to the base 40 is adjusted, the lockscrew 80 is tightened to fix the holder 50 to the base 40.

Next, description will be made of a procedure of attaching the cover 14 to the frame 13. The cover 14 is attached to the frame 13, for example, by an operator.

Figure 12:
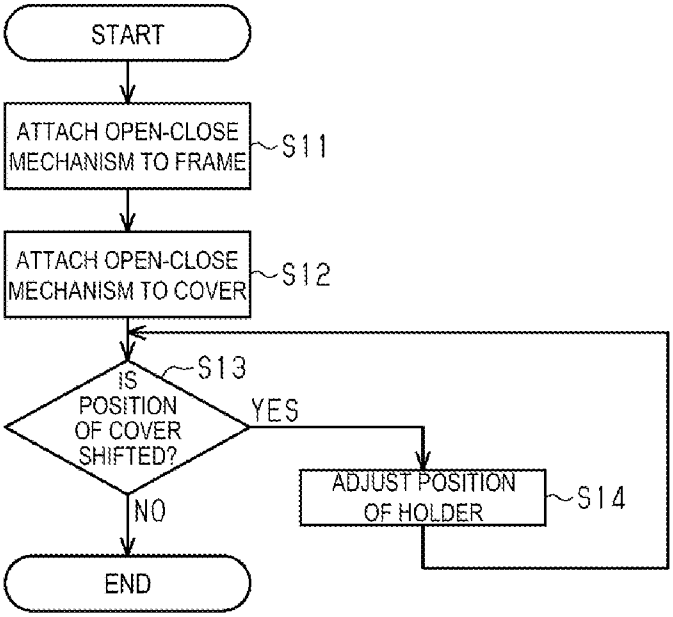
FIG. 12 is a flowchart showing a procedure of attaching the open-close mechanism.

As illustrated in FIG. 12, in step S11, the operator attaches the open-close mechanism 30 to the frame 13. That is, the operator fixes the fixing plate 43 to the first coupling plate 16 using a screw.

In step S12, the operator attaches the cover 14 to the open-close mechanism 30. That is, the operator fixes the cover 14 to the retention plate 73 using a screw. With this operation, the cover 14 is attached to the frame 13.

In step S13, the operator checks the position shift of the cover 14 relative to the frame 13. For example, the operator checks whether or not any step exists between the frame 13 and the cover 14 in a state in which the cover 14 is closed, thereby checking the position shift of the cover 14 relative to the frame 13. When the position of the cover 14 relative to the frame 13 is shifted, the operator performs the process of step S14. When the position of the cover 14 relative to the frame 13 is not shifted, attachment of the cover 14 relative to the frame 13 ends.

In step S14, the operator adjusts the position of the holder 50. At this time, the operator first loosens the lockscrews 80. With this operation, the holder 50 is able to move relative to the base 40. After adjusting the position of the holder 50, the operator tightens the lockscrews 80. After the process of step S14 ends, the operator performs the process of step S13 again.

Next, operation and effects of the embodiment described above will be described.

(1) The base 40 includes the attachment holes 48 used to attach the holder 50 and the protrusions 49 protruding toward the holder 50. The holder 50 includes the holder holes 55 overlapping with the attachment holes 48 and the guide holes 56 in which the protrusions 49 are to be inserted. The guide holes 56 are elongated holes each elongated in one direction. The holder holes 55 are elongated holes each elongated in the one direction.

With the configuration described above, the holder holes 55 are elongated holes each elongated in the one direction. This makes it possible to move the holder 50 in the one direction relative to the base 40 in a state in which the holder holes 55 overlap with the attachment holes 48. The guide holes 56 are elongated holes each elongated in the one direction. This makes it possible to move the holder 50 in the one direction relative to the base 40 in a state in which the protrusions 49 are inserted into the guide holes 56. At this time, the protrusions 49 and the guide holes 56 guide movement of the holder 50 relative to the base 40. As the holder 50 moves in the one direction relative to the base 40, the cover 14 moves in the one direction relative to the frame 13. This makes it possible to adjust the position of the cover 14 in the one direction relative to the frame 13. Thus, it is possible to appropriately open and close the cover 14 relative to the frame 13.

(2) The base 40 includes the plurality of attachment holes 48 and the plurality of protrusions 49. The holder 50 includes the plurality of holder holes 55 and the plurality of guide holes 56.

With the configuration described above, it is possible to accurately guide movement of the holder 50 with the plurality of protrusions 49 and the plurality of guide holes 56, as compared with a case in which movement of the holder 50 is guided by using one protrusion 49 and one guide hole 56. This makes it easy to adjust the position of the holder 50 relative to the base 40.

Second Embodiment

Next, a second embodiment will be described. The second embodiment differs from the first embodiment mainly in the configuration of the open-close mechanism 30. In the second embodiment, points differing from the first embodiment will be mainly described. The second embodiment employs a jig, which makes it possible to adjust the position of the holder 50. Thus, first, the jig will be described.

Figure 13:
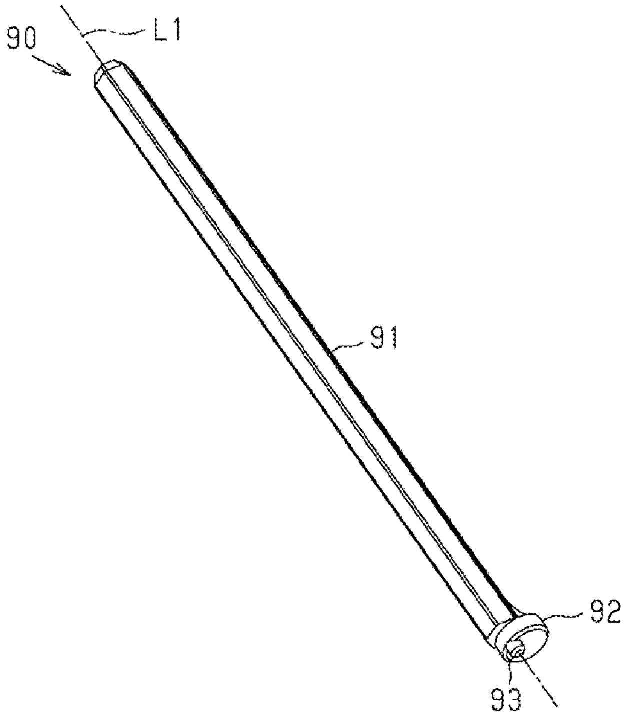
FIG. 13 is a perspective view illustrating a jig.

As illustrated in FIG. 13, a jig 90 includes a main body 91, a cam 92, and a pin 93. The jig 90 is used to adjust the position of the holder 50 relative to the base 40.

The shape of the main body 91 is, for example, a prism or a prism-like shape. The shape of the main body 91 is not limited to a prism or a prism-like shape, and may be, for example, a cylindrical shape or a cylinder-like shape. The main body 91 functions as a handle when an operator deals with the jig 90. The operator rotates the main body 91 to adjust the position of the holder 50. The operator rotates the main body 91 with an axial line L1 being the center. The axial line L1 is an imaginary line extending in the longitudinal direction of the main body 91.

The cam 92 is disposed at a tip end of the main body 91. The shape of the cam 92 is, for example, a circular shape or circle-like shape. At the tip end of the main body 91, the cam 92 is disposed so as to be eccentric relative to the main body 91. That is, when the jig 90 is viewed from the axial line L1, the center of the main body 91 is positionally shifted from the center of the cam 92. Thus, when the main body 91 rotates with the axial line L1 being the center, the cam 92 eccentrically rotates relative to the axial line L1.

The pin 93 extends from the cam 92. The pin 93 is, for example, a protrusion having a circular shape or circle-like shape. The pin 93 is not eccentric relative to the axial line L1. That is, when the jig 90 is viewed from the axial line L1, the center of the main body 91 overlaps with the center of the pin 93. Thus, as the main body 91 rotates with the axial line L1 being the center, the pin 93 rotates with the axial line L1 being the center.

Figure 14:
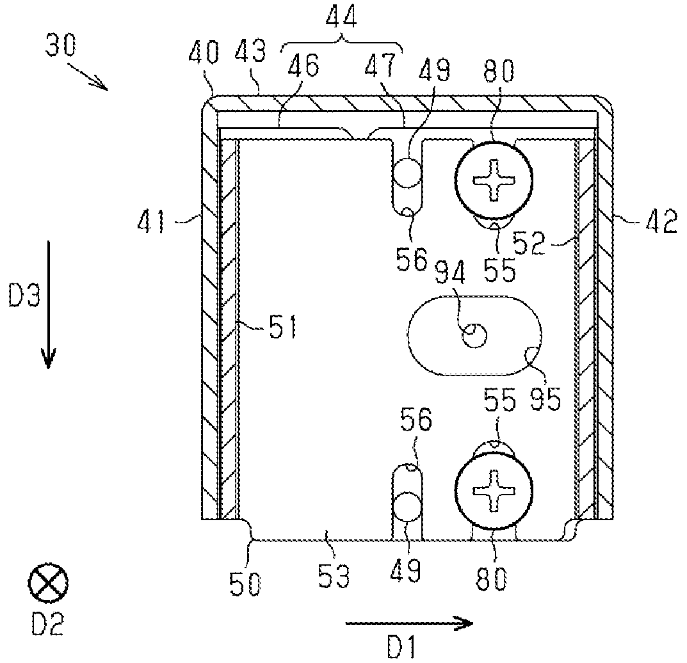
FIG. 14 is a cross-sectional view illustrating an open-close mechanism according to a second embodiment.

As illustrated in FIG. 14, in the present embodiment, the base 40 includes a pin hole 94. The pin hole 94 is a hole into which the pin 93 is inserted. The pin hole 94 is opened at the attachment plate 44. Specifically, the pin hole 94 is opened at the second attachment plate 47. The pin hole 94 is opened at the first attachment plate 46.

The holder 50 includes a cam hole 95. The cam hole 95 is a hole into which the cam 92 is inserted. The cam hole 95 is opened at the adjustment plate 53. The cam hole 95 overlaps with the pin hole 94. The cam hole 95 is opened so as to overlap with the pin hole 94 even when the holder 50 moves relative to the base 40.

The cam hole 95 is, for example, an elongated hole extending in one direction. The direction in which the cam hole 95 extends differs from a direction in which the holder hole 55 extends. The direction in which the cam hole 95 extends differs from a direction in which the guide hole 56 extends. In the present embodiment, the cam hole 95 extends in the first direction D1. In the present embodiment, the dimension of the cam hole 95 in the third direction D3 is equal to the diameter of the cam 92.

Figure 15:
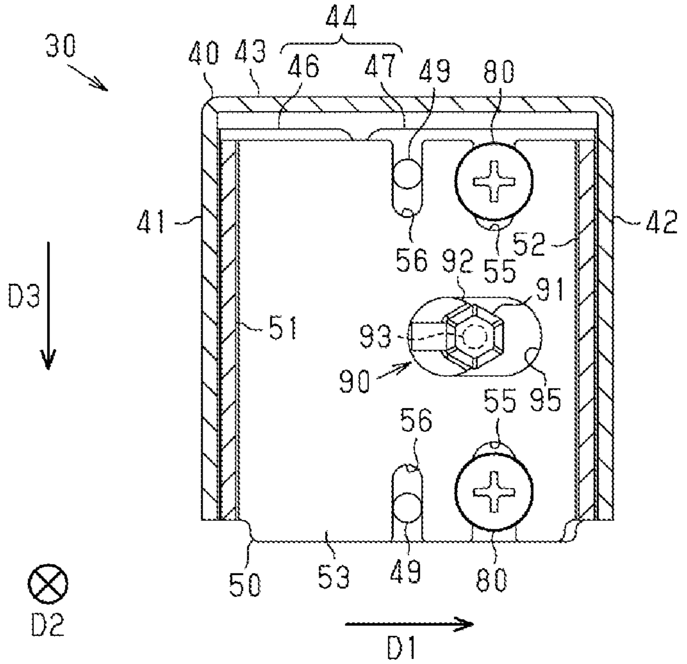
FIG. 15 is a cross-sectional view illustrating the open-close mechanism according to the second embodiment in which a jig is inserted.

As illustrated in FIG. 15, when the position of the holder 50 is adjusted, an operator uses the jig 90. The operator inserts the cam 92 and the pin 93 into the cam hole 95 and the pin hole 94, respectively. Next, the operator rotates the jig 90. At this time, the jig 90 rotates with the pin 93 being the center. As the jig 90 rotates with the pin 93 being the center, the cam 92 eccentrically rotates at the cam hole 95. Thus, the holder 50 moves in the third direction D3 in accordance with the position of the cam 92. In this manner, by rotating the jig 90, the operator is able to adjust the position of the holder 50. With the second embodiment, it is possible to obtain the following effects.

(3) The base 40 includes the pin hole 94 into which the jig 90 is inserted. The holder 50 includes the cam hole 95 overlapping with the pin hole 94. The cam hole 95 is a hole into which the cam 92 including the jig 90 is inserted.

With this configuration, as the jig 90 is inserted into the pin hole 94, the cam 92 is inserted into the cam hole 95. As the jig 90 rotates, the cam 92 rotates at the cam hole 95. This allows the holder 50 to move in one direction relative to the base 40. With the jig 90, it is possible to finely adjust the position of the holder 50 relative to the base 40.

(4) The cam hole 95 is an elongated hole extending in a direction differing from the one direction.

With this configuration, as the jig 90 rotates, the holder 50 is easily moved in one direction relative to the base 40. This makes it easy to adjust the position of the holder 50 relative to the base 40.

Third Embodiment

Next, a third embodiment will be described. The third embodiment differs from the first embodiment mainly in the configuration of the open-close mechanism 30. In the third embodiment, points differing from the first embodiment will be mainly described.

Figure 16:
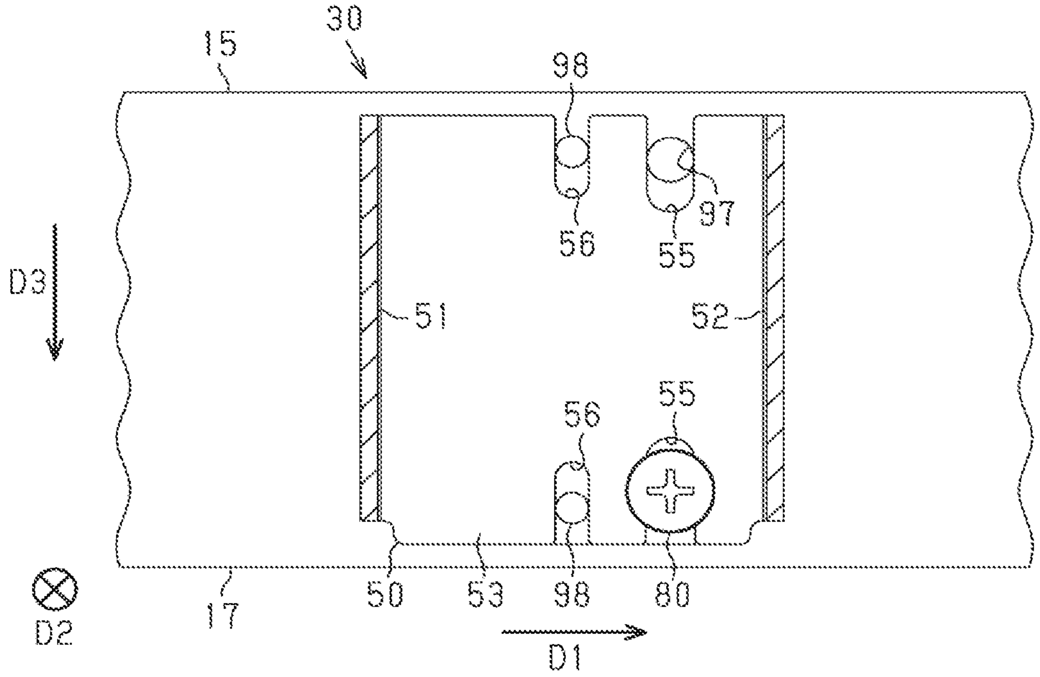
FIG. 16 is a cross-sectional view illustrating an open-close mechanism according to a third embodiment.

As illustrated in FIG. 16, in the present embodiment, the holder 50 is attached to the connection portion 15. That is, the holder 50 is attached to the frame 13. As compared with the first embodiment, the present embodiment is configured such that no base 40 is provided in the open-close mechanism 30. In the present embodiment, the open-close mechanism 30 includes the holder 50, the shaft 60, the arm 70, and the lockscrew 80.

In the present embodiment, the open-close mechanism 30 is attached to the second coupling plate 17. Thus, in the present embodiment, the frame 13 includes an attachment hole 97 and a protrusion 98. The open-close mechanism 30 may be attached to the first coupling plate 16.

The second coupling plate 17 includes one or more attachment holes 97. The attachment holes 97 are holes used to attach the holder 50. The attachment holes 97 are holes into which the lockscrews 80 are inserted. The attachment holes 97 are, for example, screw holes. The attachment holes 97 overlap with the holder holes 55. The number of the attachment holes 97 corresponds to the number of the holder holes 55.

The second coupling plate 17 includes one or more protrusions 98. The protrusions 98 protrude toward the holder 50. The protrusions 98 are inserted into the guide holes 56. The shape of the protrusion 98 is a cylindrical shape or a cylinder-like shape. The protrusions 98 protrude toward the holder 50.

By tightening the lockscrews 80 inserted into the holder holes 55 and the attachment holes 97, the holder 50 is fixed to the frame 13. By loosening the lockscrews 80, the position of the holder 50 can be adjusted. At this time, the protrusions 98 and the guide holes 56 guide the movement of the holder 50 relative to the base 40. In the present embodiment, the lockscrews 80 work in attachment of the open-close mechanism 30 relative to the frame 13 and also fixing of the holder 50. Thus, when the open-close mechanism 30 is attached, it is essential to adjust the position of the holder 50. With the third embodiment, it is possible to obtain the following effect.

(5) The frame 13 includes the attachment holes 97 used to attach the holder 50, and the protrusions 98 protruding toward the holder 50. The holder 50 includes the holder holes 55 overlapping with the attachment holes 97, and the guide holes 56 into which the protrusions 98 are inserted. The guide holes 56 are elongated holes each elongated in one direction. The holder holes 55 are elongated holes each elongated in the one direction.

With the configuration described above, the holder holes 55 are elongated holes each elongated in the one direction. This makes it possible to move the holder 50 in the one direction relative to the base 40 in a state in which the holder holes 55 overlap with the attachment holes 97. Since the guide holes 56 are elongated holes each elongated in the one direction, it is possible to move the holder 50 in the one direction relative to the base 40 in a state in which the protrusions 98 are inserted into the guide holes 56. At this time, the protrusions 98 and the guide holes 56 guide the movement of the holder 50 relative to the frame 13. As the holder 50 moves in the one direction relative to the frame 13, the cover 14 moves in the one direction relative to the frame 13. This makes it possible to adjust the position of the cover 14 relative to the frame 13 in the one direction. Thus, it is possible to appropriately open and close the cover 14 relative to the frame 13.

Fourth Embodiment

Next, a fourth embodiment will be described. The fourth embodiment differs from the first embodiment mainly in the configuration of the open-close mechanism 30. In the fourth embodiment, points differing from the first embodiment will be mainly described.

Figure 17:
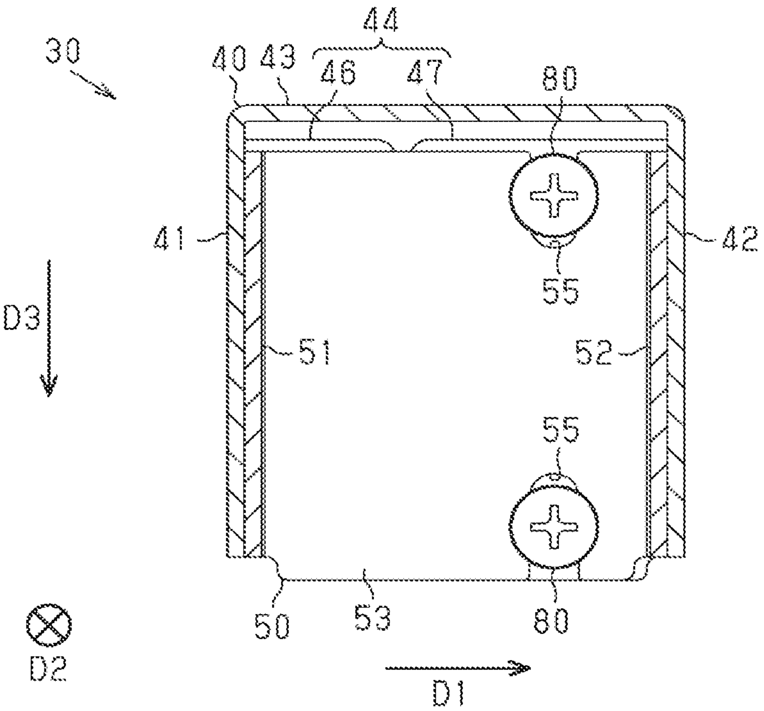
FIG. 17 is a cross-sectional view illustrating an open-close mechanism according to a fourth embodiment.

As compared with the first embodiment, the present embodiment is configured such that no protrusion 49 is provided in the base 40 as illustrated in FIG. 17. In association with this configuration, no guide hole 56 is provided in the holder 50. In the present embodiment, the first base plate 41 and the second base plate 42 guide the movement of the holder 50 relative to the base 40.

The first base plate 41 is in contact with the first holder plate 51. The second base plate 42 is in contact with the second holder plate 52. In the present embodiment, the distance between inner surfaces of the first base plate 41 and the second base plate 42 that each face inward is equal to the distance between outer surfaces of the first holder plate 51 and the second holder plate 52 that each face outward. That is, the holder 50 is interposed between the first base plate 41 and the second base plate 42. With this configuration, the holder 50 is guided by the first base plate 41 and the second base plate 42.

The distance between outer surfaces of the first base plate 41 and the second base plate 42 that each face outward may be equal to the distance between inner surfaces of the first holder plate 51 and the second holder plate 52 that each face inward. That is, the holder 50 may sandwich the base 40. With this configuration, the holder 50 is guided by the first base plate 41 and the second base plate 42. With the fourth embodiment, it is possible to obtain the following effect.

(6) The first holder plate 51 is in contact with the first base plate 41. The second holder plate 52 is in contact with the second base plate 42. The holder holes 55 are elongated holes each elongated in one direction.

With this configuration, since the holder holes 55 are elongated holes each elongated in the one direction, it is possible to move the holder 50 in the one direction relative to the base 40 in a state in which the holder holes 55 overlap with the attachment holes 48. At this time, the first base plate 41 and the second base plate 42 guide the movement of the holder 50 relative to the base 40. As the holder 50 moves in the one direction relative to the base 40, the cover 14 moves in the one direction relative to the frame 13. With this configuration, it is possible to adjust, in the one direction, the position of the cover 14 relative to the frame 13. Thus, it is possible to appropriately open and close the cover 14 relative to the frame 13.

The embodiments described above can be modified in the following manner, and be implemented. The embodiments described above and the following modification examples can be implemented in combination within a range in which no technical contradiction arises.

- The movement of the holder 50 relative to the base 40 may be guided by the lockscrews 80 and the holder holes 55. In this modification example, neither the protrusion 49 nor the guide hole 56 is necessary, as in the fourth embodiment.
- The direction in which the holder hole 55 extends is not limited to the third direction D3, and may be the first direction D1 or may be the second direction D2. The direction in which the guide hole 56 extends is not limited to the third direction D3, and may be the first direction D1 or may be the second direction D2. That is, the direction in which the holder 50 is able to move to adjust the position of the holder 50 relative to the base 40 is not limited to the third direction D3, and may be the first direction D1 or may be the second direction D2.

Below, description will be made of technical ideas and operation and effect thereof understood from the embodiments and the modification examples described above.

(A) A printing apparatus includes: a printing unit configured to perform printing on a medium; a frame configured to accommodate the printing unit; a cover configured to rotate relative to the frame to open and close relative to the frame; and an open-close mechanism attached to the frame and the cover, in which the open-close mechanism includes a base attached to the frame, a holder attached to the base, a shaft attached to the holder, an arm attached to the shaft, the cover being attached to the arm, and a lockscrew configured to fix the holder to the base, the base includes an attachment hole used to attach the holder to the base, and a protrusion protruding toward the holder, the holder includes a holder hole overlapping with the attachment hole, and a guide hole into which the protrusion is inserted, the guide hole is an elongated hole elongated in one direction, the holder hole is an elongated hole elongated in the one direction, and the lockscrew is inserted into the attachment hole and the holder hole.

With this configuration, since the holder hole is an elongated hole elongated in one direction, the holder is able to move in the one direction relative to the base in a state in which the holder hole overlaps with the attachment hole. Since the guide hole is an elongated hole elongated in the one direction, the holder is able to move in the one direction relative to the base in a state in which the protrusion is inserted into the guide hole. At this time, the protrusion and the guide hole guide the movement of the holder relative to the base. As the holder moves in the one direction relative to the base, the cover moves in the one direction relative to the frame. This makes it possible to adjust, in the one direction, the position of the cover relative to the frame. Thus, it is possible to appropriately open and close the cover relative to the frame.

(B) The printing apparatus described above may be configured such that the attachment hole is one of a plurality of attachment holes, the protrusion is one of a plurality of protrusions, the holder hole is one of a plurality of holder holes, the guide hole is one of a plurality of guide holes, the lockscrew is one of a plurality of lockscrews, the base includes the plurality of attachment holes and the plurality of protrusions, and the holder includes the plurality of holder holes and the plurality of guide holes.

With the configuration described above, the plurality of protrusions and the plurality of guide holes enable the movement of the holder to be guided in an accurate manner, as compared with a case in which the movement of the holder is guided by using one protrusion and one guide hole. This makes it easy to adjust the position of the holder relative to the base.

(C) The printing apparatus may be configured such that the base includes a pin hole into which a jig is inserted, the jig being used to adjust a position of the holder relative to the base, and the holder includes a cam hole into which a cam included in the jig inserted, the cam hole overlapping with the pin hole.

With the configuration described above, the jig is inserted into the pin hole, and the cam is inserted into the cam hole. As the jig rotates, the cam rotates in the cam hole. This allows the holder to move in one direction relative to the base. Thus, the jig makes it possible to finely adjust the position of the holder relative to the base.

(D) The printing apparatus described above may be configured such that the cam hole is an elongated hole extending in a direction differing from the one direction.

With the configuration described above, as the jig rotates, it is easy to move the holder in one direction relative to the base. This makes it easy to adjust the position of the holder relative to the base.

(E) A printing apparatus includes: a printing unit configured to perform printing on a medium; a frame configured to accommodate the printing unit; a cover configured to rotate relative to the frame to open and close relative to the frame; and an open-close mechanism attached to the frame and the cover, in which the open-close mechanism includes: a holder attached to the frame; a shaft held by the holder; an arm held by the shaft, the cover being attached to the arm; and a lockscrew configured to fix the holder to the frame, the frame includes an attachment hole used to attach the holder to the frame, and a protrusion protruding toward the holder, the holder includes a holder hole overlapping with the attachment hole, and a guide hole into which the protrusion is inserted, the guide hole is an elongated hole elongated in one direction, the holder hole is an elongated hole elongated in the one direction, and the lockscrew is inserted into the attachment hole and the holder hole.

With this configuration, since the holder hole is an elongated hole elongated in the one direction, it is possible to move the holder in the one direction relative to the base in a state in which the holder hole overlaps with the attachment hole. Since the guide hole is an elongated hole elongated in the one direction, it is possible to move the holder in the one direction relative to the base in a state in which the protrusion is inserted into the guide hole. At this time, the protrusion and the guide hole guide the movement of the holder relative to the frame. As the holder moves in the one direction relative to the frame, the cover moves in the one direction relative to the frame. This makes it possible to adjust the position of the cover in the one direction relative to the frame. Thus, it is possible to appropriately open and close the cover relative to the frame.

(F) A printing apparatus includes: a printing unit configured to perform printing on a medium; a frame configured to accommodate the printing unit; a cover configured to rotate relative to the frame to open and close relative to the frame; and an open-close mechanism attached to the frame and the cover, the open-close mechanism includes: a base attached to the frame; a holder attached to the base; a shaft held by the holder; an arm held by the shaft, the cover being attached to the arm; and a lockscrew configured to fix the holder to the base, the base includes: a first base plate extending in one direction; a second base plate extending in the one direction; and an attachment plate including an attachment hole formed therein, the attachment hole being used to attach the holder to the base, the holder includes: a first holder plate extending in the one direction and opposed to the first base plate; a second holder plate extending in the one direction and opposed to the second base plate; and an adjustment plate opposed to the attachment plate and including a holder hole formed therein and overlapping with the attachment hole, the first holder plate is in contact with the first base plate, the second holder plate is in contact with the second base plate, the holder hole is an elongated hole elongated in the one direction, and the lockscrew is inserted into the attachment hole and the holder hole.

With the configuration described above, since the holder hole is an elongated hole elongated in the one direction, it is possible to move the holder in the one direction relative to the base in a state in which the holder hole overlaps with the attachment hole. At this time, the first base plate and the second base plate guide the movement of the holder relative to the base. As the holder moves in the one direction relative to the base, the cover moves in the one direction relative to the frame. With this configuration, it is possible to adjust the position of the cover in the one direction relative to the frame. Thus, it is possible to appropriately open and close the cover relative to the frame.

What is claimed is:

1. A printing apparatus comprising:
a printing unit configured to perform printing on a medium;
a frame configured to accommodate the printing unit;
a cover configured to rotate relative to the frame to open and close relative to the frame; and
an open-close mechanism attached to the frame and the cover, wherein
the open-close mechanism includes:
a base attached to the frame;
a holder attached to the base;
a shaft attached to the holder;
an arm attached to the shaft, the cover being attached to the arm; and
a lockscrew configured to fix the holder to the base,
the base includes:
an attachment hole used to attach the holder to the base; and
a protrusion protruding toward the holder,
the holder includes:
a holder hole overlapping with the attachment hole; and
a guide hole into which the protrusion is inserted,
the guide hole is an elongated hole elongated in one direction,
the holder hole is an elongated hole elongated in the one direction, and
the lockscrew is inserted into the attachment hole and the holder hole.

2. The printing apparatus according to claim 1, wherein
the attachment hole is one of a plurality of attachment holes,
the protrusion is one of a plurality of protrusions,
the holder hole is one of a plurality of holder holes,
the guide hole is one of a plurality of guide holes,
the lockscrew is one of a plurality of lockscrews,
the base includes:
the plurality of attachment holes; and
the plurality of protrusions, and
the holder includes:
the plurality of holder holes; and
the plurality of guide holes.

3. The printing apparatus according to claim 1, wherein
the base includes a pin hole into which a jig is inserted, the jig being used to adjust a position of the holder relative to the base, and
the holder includes a cam hole into which a cam included in the jig is inserted, the cam hole overlapping with the pin hole.

4. The printing apparatus according to claim 3, wherein
the cam hole is an elongated hole extending in a direction differing from the one direction.

5. A printing apparatus comprising:
a printing unit configured to perform printing on a medium;
a frame configured to accommodate the printing unit;
a cover configured to rotate relative to the frame to open and close relative to the frame; and
an open-close mechanism attached to the frame and the cover, wherein
the open-close mechanism includes:
a holder attached to the frame;
a shaft held by the holder;
an arm held by the shaft, the cover being attached to the arm; and
a lockscrew configured to fix the holder to the frame,
the frame includes:
an attachment hole used to attach the holder to the frame; and
a protrusion protruding toward the holder,
the holder includes:
a holder hole overlapping with the attachment hole; and
a guide hole into which the protrusion is inserted,
the guide hole is an elongated hole elongated in one direction,
the holder hole is an elongated hole elongated in the one direction, and
the lockscrew is inserted into the attachment hole and the holder hole.

6. A printing apparatus comprising:
a printing unit configured to perform printing on a medium;
a frame configured to accommodate the printing unit;
a cover configured to rotate relative to the frame to open and close relative to the frame; and
an open-close mechanism attached to the frame and the cover, wherein
the open-close mechanism includes:
a base attached to the frame;
a holder attached to the base;
a shaft held by the holder;
an arm held by the shaft, the cover being attached to the arm; and
a lockscrew configured to fix the holder to the base,
the base includes:
a first base plate extending in one direction;
a second base plate extending in the one direction; and
an attachment plate including an attachment hole formed therein, the attachment hole being used to attach the holder to the base,
the holder includes:
a first holder plate extending in the one direction and opposed to the first base plate;
a second holder plate extending in the one direction and opposed to the second base plate; and
an adjustment plate opposed to the attachment plate, and including a holder hole formed therein and overlapping with the attachment hole,
the first holder plate is in contact with the first base plate,
the second holder plate is in contact with the second base plate,
the holder hole is an elongated hole elongated in the one direction, and
the lockscrew is inserted into the attachment hole and the holder hole.

* * * * *